April 26, 1955  A. GREENFIELD  2,707,128
VISOR CENTER BRACKET WITH AERIAL SPANNING FOOT
Filed Jan. 5, 1951  2 Sheets-Sheet 1
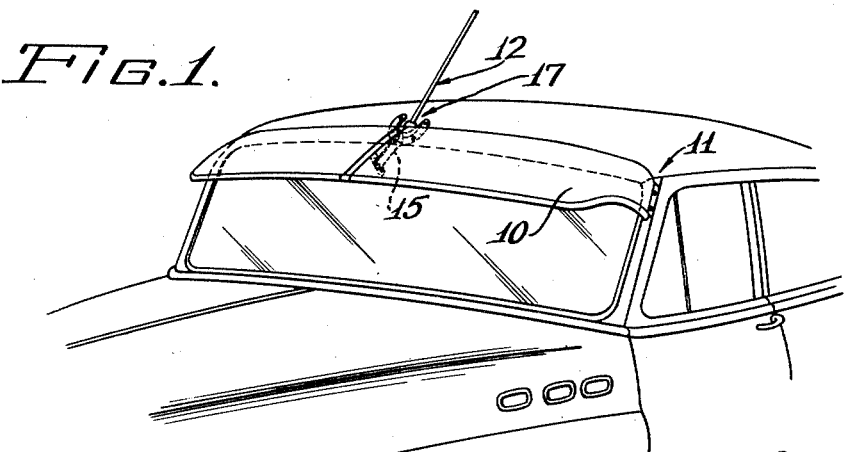
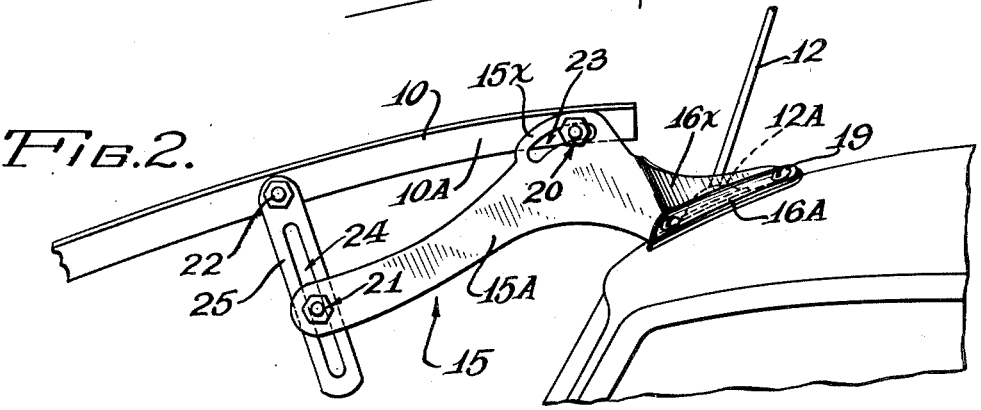
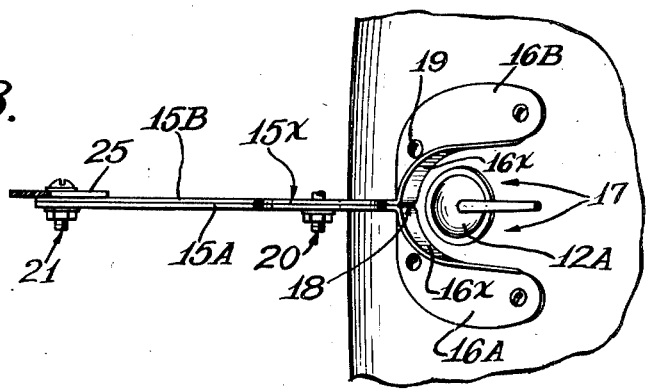
INVENTOR.
Alec Greenfield
BY
Atty.

April 26, 1955
A. GREENFIELD
2,707,128
VISOR CENTER BRACKET WITH AERIAL SPANNING FOOT
Filed Jan. 5, 1951
2 Sheets-Sheet 2
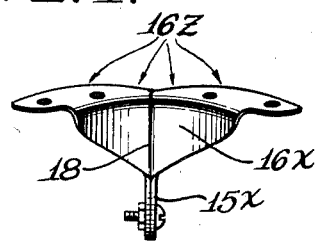
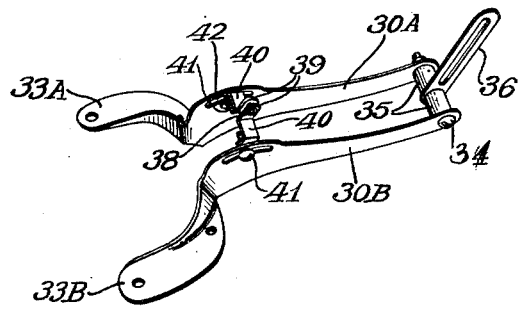
INVENTOR.
Alec Greenfield
BY
Atty.

United States Patent Office 2,707,128
Patented Apr. 26, 1955

2,707,128

VISOR CENTER BRACKET WITH AERIAL SPANNING FOOT

Alec Greenfield, Chicago, Ill., assignor to The Greenfield Company, Chicago, Ill., a copartnership Application January 5, 1951, Serial No. 204,591

3 Claims. (Cl. 296—95)

This invention has as its principal object the provision of a center-supporting bracket for automobile visors, characterized by formations adapted especially to mounting on the car roof in distinction to the previously known types adapted to mounting on the center post of a windshield.

Another aspect of novelty and utility of the bracket resides in the formation of mounting appendages constituting diverged concave feet adapted to span a roof-mounted radio antenna.

A further characteristic of the improved bracket lies in the configuration of a pair of right and left mounting bracket members which are simple stampings easily secured in assembled relation by adjustable visor-supporting means of great strength and stability.

Additional objects and aspects of novelty and utility pertain to details of the preferred form of the bracket described hereinafter in view of the annexed drawing, in which:

Fig. 1 is a partial perspective of an automobile having a visor supported centrally by the new bracket means;

Fig. 2 is a side elevation of the bracket to enlarged scale with parts of the visor and car cab shown in fragment;

Fig. 3 is a top plan view of the bracket with the car cab shown in fragment;

Fig. 4 is an endwise elevation of the base or foot portion of the bracket;

Fig. 5 is a perspective view of a modified form of the bracket for special installation.

In Fig. 1 there is depicted a visor 10 supported at its opposite ends (as at 11) by engagement with portions of the car body, usually near or at the juncture of the roof and side portions, sometimes by means of fastenings engaged in the roof or adjoining structure (as shown) and sometimes by means of clamps engaging the side gutters (not shown).

In such installations it is necessary to provide additional support for the visor to afford a safe, suitable rigidity for the visor, which is usually of light construction and subjected to very great stresses due to windage and like forces.

Heretofore, such visors were centrally supported by one or more center brackets engaged with the center posts of conventional windshield structures.

However, with the advent of one-piece windshields having no center post, such support was not available, and special bracket means had to be contrived to afford the essential central support.

Automotive design is now such as to position radio antennae of the whip type centrally and forwardly of the car roof (as in the positioning of the aerial 12 in Fig. 1) in such proximity to the leading or forward margin of the roof as to leave no room for the essential center bracket.

The bracket structure disclosed herein makes it possible to mount the same centrally at the forward margin of a curved top or roof in very close proximity to the radio antenna, while affording wholly adequate support for the mid-regions of the visor.

The improved antenna-spanning bracket 15, as shown in Figs. 2 and 3, consists of a pair of mating (right and left) metal stampings 15A and 15B of elongated form, and each terminating at one end in an offset curved foot portion 16A or 16B, such that the two stampings are complementary; and in assembled relation their respective foot portions define a yoke, generally indicated at 17, of such character as to fit around the base or mounting foot 12A of the antenna.

The foot portions 16A, 16B are formed with an offset, upstanding flange or web 16X, and these webs flow upwardly to a confronting juncture as at 18, to afford great mutual rigidifying effect for the bracket in its assembled condition.

The aforesaid foot members are so curved on the undersides, as at 16Z, as to afford a somewhat concave configuration (see Fig. 4) so as to fit closely onto the curved roof surface perforated to receive mounting means, such as screw 19, engaging with the car roof, and by this means in part the bracket sections are maintained in juxtaposition.

Additional assembly means includes the bolt means 20 passing through the central meeting flanges 10A of the visor and thence through an arcuate slot 23 in a raised crown portion 15X of the bracket stampings, which crown is elevated relative to the feet or yoke so as to afford a clearance between the trailing edge of the visor and the car top.

The arcuate slot 23 in the crown accommodates the pitch of the visor in conjunction with an adjustable thrust arm 25, longitudinally slotted as at 24, and clamped by bolt means 21 passing through the elongated slot and the forward or free ends of the bracket assembly which are remote from the yoke 17 thereof. The end of the arm 25 is secured to the visor meeting flanges 10A by bolt means 22.

The installation of the bracket is simple, requiring in the usual case nothing more than common tools. By turning home the screws 19 (preferably of the self-tapping variety) and the bolt means 20, 21, and 22, the device is firmly secured in operative position.

Ample clearance is afforded about the foot of the antenna, while maintaining the bracket in central position.

The adaptability of the bracket is further illustrated in the modification of Fig. 5, wherein a pair of mating bracket stampings 30A and 30B, identical in form to brackets 15A and 15B, is adapted to two special installation problems now frequently encountered with late design one-piece windshield structures.

In the first situation the radio antenna 12 may be found to be installed very close to the forward edge of the car top adjoining the windshield, so that the assembly of the two bracket arms 15A, 15B, close together, as in Fig. 3, is not possible if the bracket arms are to be kept out of contact with the antenna.

In such a mounting situation the two bracket arms 30A, 30B are spaced as in Fig. 5 so that the offset foot parts 33A and 33B are clear of the antenna 12 and any base parts 12A thereof.

The two bracket arms 30A, 30B are joined at their forward ends by bolt means 34 extending therethrough and through spacing members or collars 35 with the forward visor supporting arm 36 gripped between said collars.

As in the case of the type of installation shown in Fig. 2, the wide-spanning installation of Fig. 5 also has supporting engagement with the center flange 10A of the visor, said flange being engaged by bolt means 38 in the confronting offsets 39 of a pair of Z-shaped angles or cleats 40, each secured as by bolt means 41 in one of the arcuate slots 42 (such as those indicated at 23, Fig. 2) in the crown parts of each arm.

Regardless of the location of the antenna, whether close to the leading edge of the roof (as in Fig. 5) or otherwise (as in Fig. 3), the wide-spanning installation of Fig. 5 may be necessary in connection with visors which require (because of weight or inadequate rigidity, or inadequate support at the outermost ends of the visor, or a combination of these and another factor hereinafter mentioned) exceptionally good support at the center of the visor or on the car roof.

Another situation is encountered where the load on the center bracket is such as to require a wider spacing of the base or foot portions 33A, 33B, by reason of the fact that the metal of the car roof is thin and the brackets ordinarily may be attached to the roof only by short, self-tapping screws, so that there may be a strain set up, or a sufficient bending or stress to permit the screws to tear out.

In still other installations, the car roof design may include a central ridge, which is nevertheless easily spanned by the wide-spanning embodiment of Fig. 5.

I claim:

1. A roof-mounting antenna-spanning center bracket for automobile visors, and comprising complementary right and left bracket sections each consisting of an elongated arm portion adapted to underlie and support a central part of said visor and each section having an offset recurved foot portion which defines half of a U-shaped yoke completed by juxtaposition of said foot portions when said sections are in assembled relation, said foot portions being additionally curved to afford a concavity adapted to fit closely against a roof having a substantially matching convex curvature in the region where the bracket is to be mounted, and means removably securing said sections in aligned assembled relation, as aforesaid, said bracket being adapted for wide-spanning installation and having removable spacer collars between the free ends of said arm portions, bolt means securing said ends and spacer collars in assembly, a visor-supporting arm pivotally mounted on said bolt means between said spacer collars for adjustable supporting engagement with a center portion of a visor, together with a pair of angle cleats each secured to one of said arms in the region adjoining said foot portions, said cleats having visor-supporting offsets in juxtaposition with each other for supporting engagement with a center portion of said visor which is in fore and aft alignment with the center portion thereof supported by said adjustable supporting arm.

2. A center supporting bracket for automobile visors and adapted for mounting at the forward central marginal region of the roof of an automobile having convex curvature at said region with an antenna projection therefrom, said bracket comprising: a pair of complementary, elongated arms each having an oppositely offset recurved foot portion defining half of a U-shaped yoke, each said arm having an upper crown portion adjoining its foot portion, there being an arcuate fore-and-aft extending slot in each said crown portion, a pair of spacer collars separating the free ends of said arms, an elongated securing member passing through said free ends and collars to secure the same in assembled relation, an elongated visor-supporting arm pivotally mounted on said elongated securing member and adapted to supportably engage a central portion of a visor secured to project forwardly from said roof margin, each said bracket arm having an angle cleat adjustably carried thereby by bolt means engaged in one of said arcuate slots, each cleat having a visor supporting offset in juxtaposition with the like offset of the cleat on the complementary arm, said visor supporting offsets at their juxtaposed parts being in substantial fore-and-aft alignment with said supporting arm, said foot portions being curved on their undersides to afford a concavity adapted to fit onto the convex curvature of the roof as aforesaid, said yoke spanning said antenna.

3. The combination, with an automobile cab having an antenna mounted at the central forward roof margin of the cab, and an outside visor supported at opposite lateral margins of the visor by means engaged with side parts of the cab roof near said forward roof margin, of antenna-spanning, visor-supporting means comprising: a pair of mating, elongated bracket arms each having an outwardly offset foot fastened to said forward roof margin of the cab, one on each side of said antenna; the two feet of said mating arms, in assembled relation as aforesaid, defining a U-shaped yoke partly encircling said antenna, with said arms projecting forwardly of the cab beneath said visor, said arms having cleat means pivotally attached thereto and projecting upwardly for supporting connection with said visor; and a supporting finger pivotally carried by said bracket arms near the end thereof remote from said yoke feet and supportably engaged with the underside of said visor.

References Cited in the file of this patent

UNITED STATES PATENTS

| | | |
|---|---|---|
| 419,137 | Bobemerith | Jan. 7, 1890 |
| 508,816 | Craig | Nov. 14, 1893 |
| 643,773 | Mitcalf | Feb. 20, 1900 |
| 1,176,137 | Ette | Mar. 21, 1916 |
| 1,864,943 | Riddle | June 28, 1932 |
| 2,064,671 | Lockaton | Dec. 15, 1936 |
| 2,301,397 | Hacker | Nov. 10, 1942 |
| 2,447,152 | Baker | Aug. 17, 1948 |
| 2,527,247 | Dieterich | Oct. 24, 1950 |